United States Patent
Hasegawa et al.

(10) Patent No.: US 11,868,794 B2
(45) Date of Patent: *Jan. 9, 2024

(54) NETWORK SYSTEM, MANAGEMENT METHOD AND APPARATUS THEREOF, AND SERVER

(71) Applicant: NEC Corporation, Tokyo (JP)

(72) Inventors: Hideo Hasegawa, Tokyo (JP); Shintaro Nakano, Tokyo (JP); Satoru Ishii, Tokyo (JP); Seiya Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/674,172

(22) Filed: Feb. 17, 2022

(65) Prior Publication Data

US 2022/0171650 A1 Jun. 2, 2022

Related U.S. Application Data

(63) Continuation of application No. 16/089,808, filed as application No. PCT/JP2017/012221 on Mar. 27, 2017, now Pat. No. 11,288,086.

(30) Foreign Application Priority Data

Mar. 31, 2016 (JP) .................. 2016-070565

(51) Int. Cl.
*G06F 7/62* (2006.01)
*G06F 9/455* (2018.01)
(Continued)

(52) U.S. Cl.
CPC ........ *G06F 9/45558* (2013.01); *G06F 9/4856* (2013.01); *G06F 9/5077* (2013.01);
(Continued)

(58) Field of Classification Search
CPC ........ G06F 9/544; G06F 9/455; G06F 12/023; G06F 2212/152; G06F 2009/45591;
(Continued)

(56) References Cited

U.S. PATENT DOCUMENTS 9,979,602 B1* 5/2018 Chinnakannan ...... H04L 47/803
2014/0068045 A1 3/2014 Tarui et al.
(Continued)

FOREIGN PATENT DOCUMENTS

JP 2012-175418 A 9/2012
JP 2013-191089 A 9/2013
(Continued)

OTHER PUBLICATIONS

Network Functions Virtualizatons—Update White Paper, Oct. 15-17, 2013 at the "SDN and OpenFlow World Congress", Frankfurt Germany, pp. 1-16, Issue 1, (http://portal.etsi.org/NFV/NFV_White_Paper2.pdf).

(Continued)

*Primary Examiner* — Kevin L Young
*Assistant Examiner* — Abdou K Seye
(74) *Attorney, Agent, or Firm* — Sughrue Mion, PLLC

(57) ABSTRACT

A management apparatus (10) includes: a storage (103) that stores information indicating a correspondence between at least one virtual network function (VNF) operating on a server and a programmable logic circuit (FPGA) capable of operating at least part of a virtual network function; and a controller (106) that causes first and second servers to perform migration of a virtual network function operating on a programmable logic circuit of the first server to the second server, on the basis of the correspondence information.

9 Claims, 15 Drawing Sheets

(51) Int. Cl.
   *G06F 9/50* (2006.01)
   *G06F 9/48* (2006.01)
   *H04L 41/22* (2022.01)
   *H04L 67/10* (2022.01)

(52) U.S. Cl.
   CPC ............ *G06F 9/5088* (2013.01); *H04L 41/22* (2013.01); *H04L 67/10* (2013.01); *G06F 2009/4557* (2013.01); *G06F 2009/45595* (2013.01)

(58) Field of Classification Search
   CPC ............ G06F 9/45558; G06F 11/3632; G06F 11/3636; G06F 11/3652; G06F 11/3664; G06F 11/36
   See application file for complete search history.

(56) References Cited

U.S. PATENT DOCUMENTS

| | | | |
|---|---|---|---|
| 2014/0207920 | A1 | 7/2014 | Hirana |
| 2016/0112261 | A1* | 4/2016 | Amato ................ H04L 41/0869 709/220 |
| 2016/0212017 | A1 | 7/2016 | Li ........................... H04L 41/12 |
| 2016/0224409 | A1* | 8/2016 | Liu ........................ H04L 67/10 |
| 2016/0234077 | A1 | 8/2016 | Rottenstreich et al. |
| 2016/0328252 | A1 | 11/2016 | Singh .................. G06F 9/45558 |
| 2017/0017512 | A1 | 1/2017 | Csatari .................. G06F 9/4856 |
| 2017/0031986 | A1 | 2/2017 | Li ...................... G06F 16/24542 |
| 2017/0086118 | A1* | 3/2017 | Vrzic .................... H04W 36/26 |
| 2017/0177396 | A1* | 6/2017 | Palermo ............. G06F 9/45558 |
| 2017/0264680 | A1 | 9/2017 | Palermo ................ G06F 30/331 |

FOREIGN PATENT DOCUMENTS

| | | | |
|---|---|---|---|
| JP | 2014-049773 A | 3/2014 | |
| JP | 2014-142678 A | 8/2014 | |
| JP | 2016-040876 A | 3/2016 | |
| WO | 2015135611 A1 | 9/2015 | |
| WO | WO-2015135611 A1 | 9/2015 | ........... G06F 9/4856 |

OTHER PUBLICATIONS

ETSI GS NFV 001 v1.1.1 (Oct. 2013) "Network Functions Virtualization (NFV); Use Cases," Oct. 2013, pp. 1-50, (http://docbox.etsi.org/ISG/NFV/Open/Published/gs_NFV001v010101p%20-%20Use%20Cases.pdf).
International Search Report of PCT/JP2017/012221 dated May 30, 2017.
Nobach. L., et al., "Open, Elastic Provisioning of Hardware Acceleration in NFV Environments", IEEE, 2015, pp. 1-5 (6 pages), XP 032764878.
Communication dated Mar. 7, 2019 from the European Patent Office in application No. 17774846.4.
Japanese Office Action for JP Application No. 2018-509291 dated Feb. 3, 20221 with English Translation.
Zvika Bronstein et al., Uniform Handling and Abstraction of NFV Hardware Accelerators, IEEE Network (vol. 29, Issue: 3, May-Jun. 2015),p. 22-29, Jun. 1, 2015.
Konomi Mochizuki, "Relocation Method of Virtual Edge VNFs to Shorten Service Disconnection Time", IEICE Technical Report vol. 115, No. 326, Japan, The Institute of Electronics Information and Communication Engineers, Nov. 19, 2015, pp. 1-6.
U.S. Office Actions and PTO-892 for U.S. Appl. No. 16/089,808, dated Apr. 7, 2020.

* cited by examiner

FIG. 6

VNF

| VNF NAME | FUNCTIONALITY | FPGA | MASTER IMAGE FILE | FPGA COMPATIBILITY |
|---|---|---|---|---|
| Firewall_VNF | Firewall | YES | /VNF/Firewall.vmdk | Firewall_FPGA |
| Inspection_VNF | Inspection | YES | /VNF/Inspection.vmdk | Inspection_FPGA |
| Routing_VNF | Routing | YES | /VNF/Routing.vmdk | Routing_FPGA |

SERVER

| HOST | IP ADDRESS/DOMAIN/... | FPGA TYPE | FPGA CORES |
|---|---|---|---|
| Host1 | : | XXX type | 4 |
| Host2 | : | XXX type | 4 |

FPGA

| FPGA NAME | CONFIGURATION DATA | FPGA HARDWARE COMPATIBILITY |
|---|---|---|
| Firewall_FPGA | /PathConfig1.data | XXX type |
| Inspection_FPGA | /PathConfig2.data | XXX type |
| Routing_FPGA | /PathConfig2.data | XXX type |

STATIC CONFIGURATION INFORMATION

NETWORK SYSTEM, MANAGEMENT METHOD AND APPARATUS THEREOF, AND SERVER

CROSS-REFERENCE TO RELATED APPLICATIONS

The present application is a continuation application of U.S. patent application Ser. No. 16/089,808 filed on Sep. 28, 2018, now U.S. Pat. No. 11,288,086, issued Mar. 29, 2022, which is a National Stage Entry of international application PCT/JP2017/012221, filed on Mar. 27, 2017, which claims the benefit of priority from Japanese Patent Application 2016-070565 filed on Mar. 31, 2016, the disclosures of all of which are incorporated in their entirety by reference herein.

TECHNICAL FIELD

The present invention relates to a network system including a server on which a virtual network function can run and, in particular, to a management method and apparatus thereof and a server.

BACKGROUND ART

In current communication systems, various network functions (NFs), such as a broadband remote access server (BRAS), network address translation (NAT), a router, a firewall (FW), and deep packet inspection (DPI) are implemented by dedicated hardware devices (appliances). For this reason, when launching a new network service, the network operator is forced to introduce a new dedicated hardware device, requiring significant costs for purchasing appliances, installation spaces, and the like. Under such circumstances, there have been considered in recent years technologies that virtually implement network functions by software rather than by hardware devices (network function virtualization) (Non-Patent Literature 1). As an example of network service virtualization, Patent Literature 1 discloses a method by which multiple virtual routers are constructed on communication node devices and the resources of these virtual routers are dynamically distributed in accordance with communication quality.

There have been also considered technologies that provide various network services by transmitting a communication flow through a communication path obtained by combining multiple virtual network functions (VNFs) (for example, see Non-Patent Literature 2).

As illustrated in FIG. 1, in network function virtualization, network services are configured and managed by logical links between virtual network functions VNFs (forwarding graph). Here, a network service composed of five virtual network functions VNF-1 to VNF-5 is illustrated in an overlay network.

The virtual network functions VNF-1 to VNF-5 in this forwarding graph operate on general-purpose servers SV1 to SV4 in an NFV infrastructure (NFVI). By virtually operating carrier-grade functions on the general-purpose servers rather than dedicated servers, cost reduction and operability improvement can be achieved.

CITED LITERATURE

Patent Literature

[Patent Literature 1] Japanese Unexamined Patent Application Publication No. 2012-175418

Non-Patent Literature

[Non-Patent Literature 1] Network Functions Virtualization—Update White Paper, Oct. 15-17, 2013 at the "SDN and OpenFlow World Congress", Frankfurt-Germany (http://portal.etsi.org/NFV/NFV_White_Paper2.pdf)

[Non-Patent Literature 2] ETSI GS NFV 001 v1.1.1 (2013-10) "Network Functions Virtualization (NFV); Use Cases" (http://docbox.etsi.org/ISG/NFV/Open/Published/gs_NFV001v010101p%20-%20Use%20Cases.pdf)

SUMMARY OF THE INVENTION

Technical Problem

However, implementation of NFV using a general-purpose server may cause a bottleneck in CPU (central processing unit) processing in a server, server-to-server communication, or the like. Avoiding such a bottleneck requires speeding up the servers. As a technology of accelerating CPU processing, in addition to an increase of the number of CPU cores, an accelerator technology of connecting a field-programmable gate array (FPGA) to a CPU has been known (e.g., "Xeon+FPGA Platform for the Data Center" ISCA/CARL 2015<http://www.ece.cmu.edu/to calcm/carl/lib/exe/fetch.php?media=car115-gupta.pdf>).

However, implementation of NFV using such FPGA-added servers causes a VNF to run not only on the CPU but also on the FPGA. Accordingly, it is necessary to manage a correspondence between the FPGA and the VNF in the network. For example, it is necessary to solve a problem of whether or not a server is FPGA-equipped, a problem of which VNF uses which FPGA, and a problem that when, how, and what is set to an FPGA when a correspondence relation between a VNF and NFVI (COTS (commercial Off-The Shelf) server/VM/FPGA) is changed Also, for example, in the case of maintenance of a server on which a VNF is running or in the case where it is desirable for a faster server to run a performance-reduced VNF, there are cases where it is necessary to perform migration of the running VNF to another server. In the case of an ordinary virtual machine (VM), for example, there are known technologies that move the VM to another server in the same network (e.g., live migration software vMotion® of VMware, Inc). By using such a technology, a VM can be moved to another server without the user of the VM being aware of it.

However, if NFV is implemented using FPGA-added servers, the central controller which controls the servers has to manage the entire network on the precondition that each server includes an FPGA core, and such a management technology has not been proposed thus far.

As described above, in a network in which some servers, as a VNF infrastructure, include not only a CPU but also a programmable logic circuit, such as an FPGA, it is necessary to employ a special management technique taking the programmable logic circuits into account.

Accordingly, an object of the present invention is to provide a network system, a management method and apparatus thereof, and a server that allows network management including VNF migration, in a network including programmable logic circuits as VNF infrastructure.

Solution to Problem

A network management apparatus according to the present invention is a management apparatus of a network including servers on which virtual network functions operate, comprising: a storage means that stores information indicating a correspondence between at least one virtual network function operating on a server and a programmable logic circuit capable of operating at least part of a virtual network function; and a control means that causes first and second servers to perform migration of a virtual network function operated by a programmable logic circuit of the first server to the second server, based on the information indicating the correspondence.

A network management method according to the present invention is a management method of a network including servers on which virtual network functions operate, comprising: storing, in a storage means, information indicating a correspondence between at least one virtual network function operating on a server and a programmable logic circuit capable of operating at least part of a virtual network function; and causing, by a control means, first and second servers to perform migration of a virtual network function operated by a programmable logic circuit of the first server to the second server, based on the information indicating the correspondence.

A server according to the present invention is a server including a central processing unit (CPU) that can serve as an entity that runs at least one virtual network function; a programmable logic circuit that can serve as an entity that runs at least one virtual network function; and a control means that performs migration of a virtual network function operated by the programmable logic circuit from the server to another server.

A server according to the present invention is a server including a central processing unit (CPU) that can serve as an entity that runs at least one virtual network function; a programmable logic circuit that can serve as an entity that runs at least one virtual network function; and a control means that performs migration of a virtual network function running on a programmable logic circuit of another server from the another server to the server.

A network system according to the present invention is a network system including servers on which virtual network functions operate. The network system includes a lower-layer network to which a plurality of servers each including at least one programmable logic circuit are connected; a higher-layer network including at least one virtual network function operating on one of the servers; and a management apparatus that manages the lower-layer network and the upper-layer network, wherein the management apparatus causes first and second servers to perform migration of a virtual network function operated by a programmable logic circuit of the first server to the second server, based on information indicating a correspondence between at least one virtual network function operating on a server and a programmable logic circuit capable of operating at least part of a virtual network function.

Advantageous Effects of the Invention

According to the present invention, migration of a VNF to another server is enabled in a network including programmable logic circuits as VNF infrastructure.

BRIEF DESCRIPTION OF DRAWINGS

FIG. 6 is a schematic diagram showing an example of static configuration information in a configuration information database in the management apparatus shown in FIG. 5.

DESCRIPTION OF EMBODIMENTS

Overview of Embodiments

According to an embodiment of the present invention, in a network system in which virtual network functions (VNFs) can run on servers, migration of a VNF running on a programmable logic circuit of a server is performed with reference to correspondence among servers, programmable logic circuits, and VNFs. More specifically, a programmable logic circuit similar to the programmable logic circuit of a first server is configured in a second server, and a VNF identical to that of the first server runs on the second server. Thus, migration of the VNF can be performed considering the programmable logic circuits of the servers, and various types of network management including VNF migration can be performed.

First, referring to FIGS. 2 to 4, an example of a system configuration for explaining embodiments of the present invention will be described. This system configuration is an example simplified to avoid complication of the explanation and does not limit the present invention.

<System>

Figure 1:
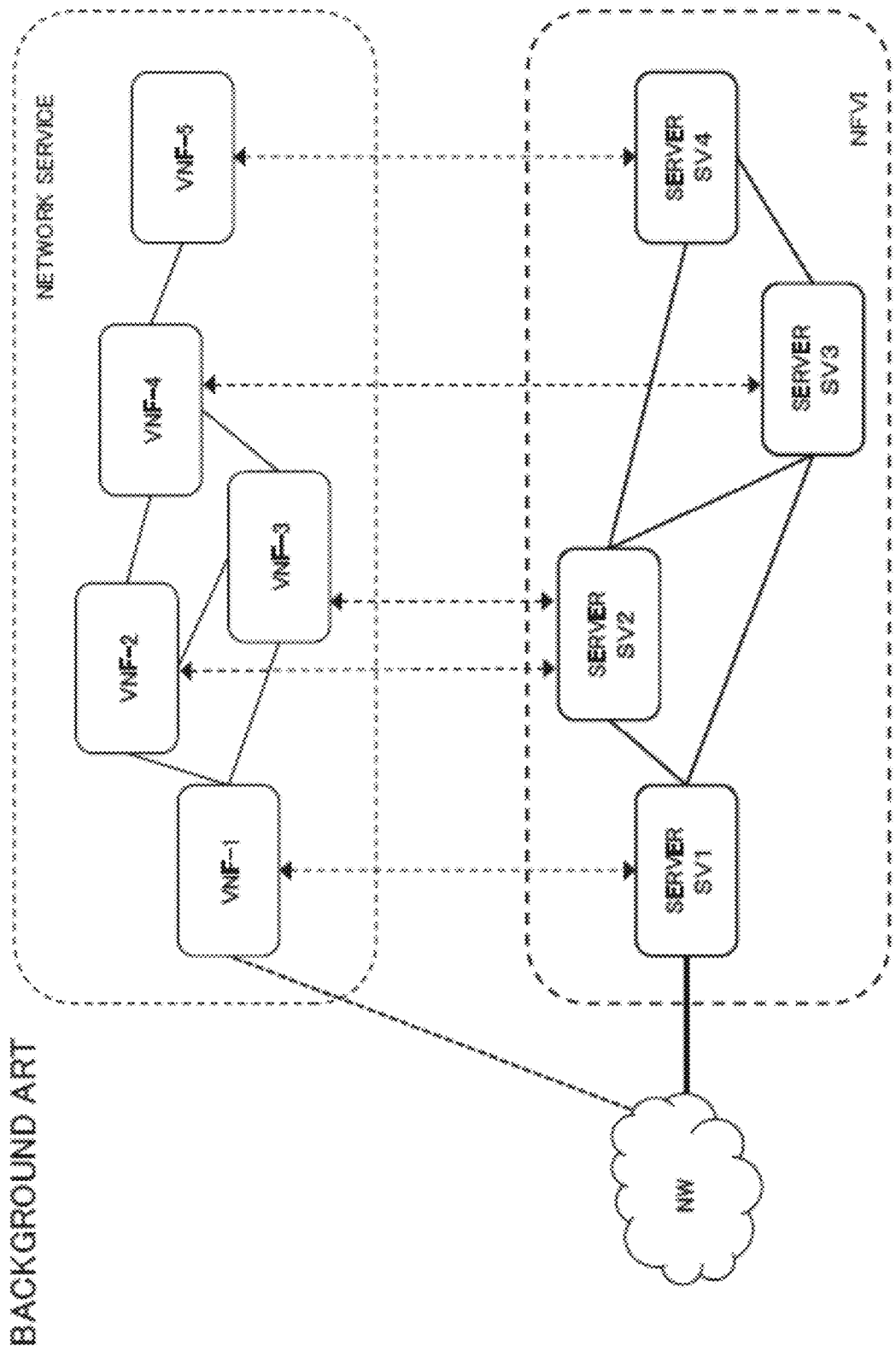
FIG. 1 is a schematic network diagram showing an example of network function virtualization.
Figure 2:
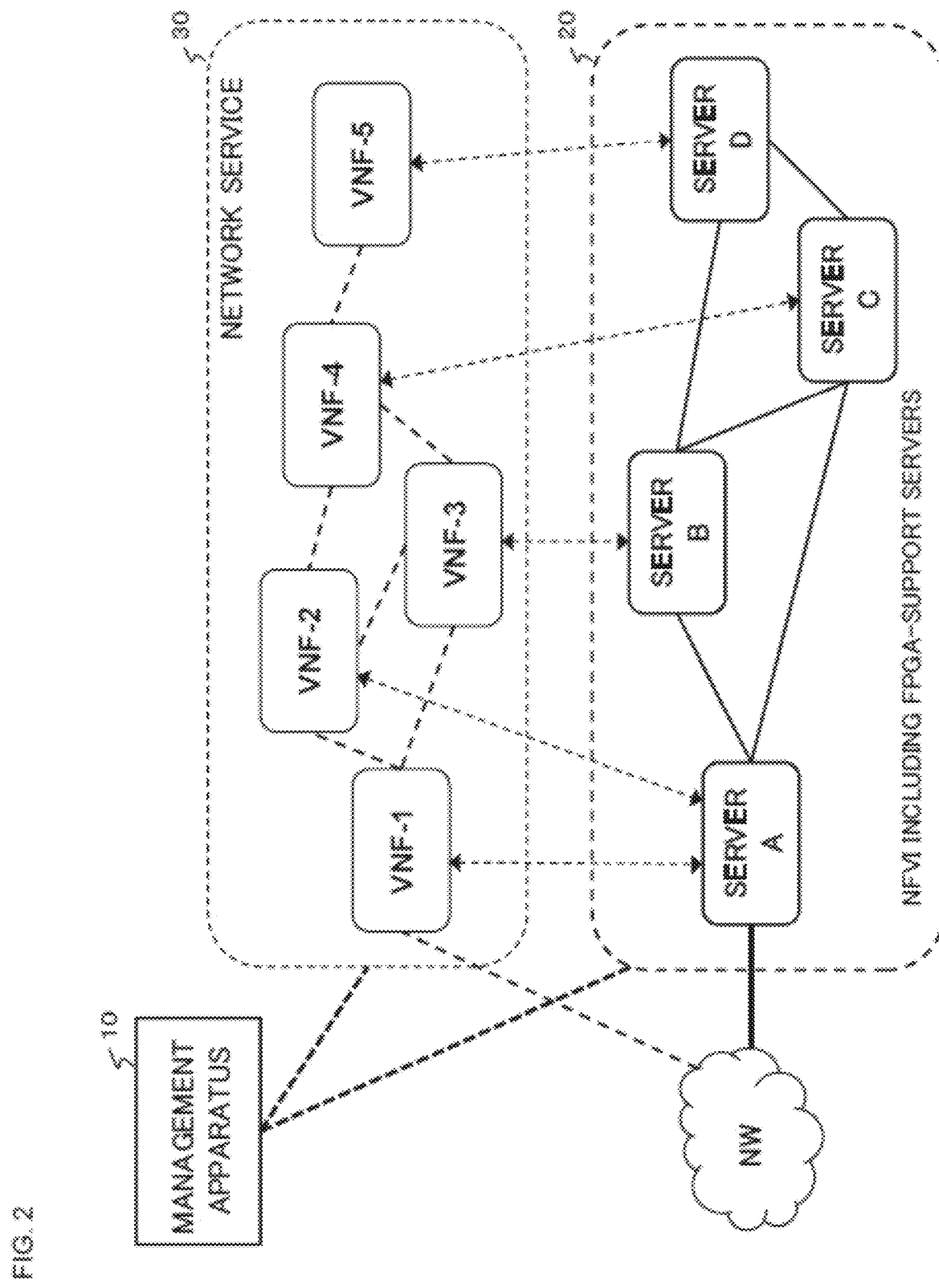
FIG. 2 is a schematic network diagram showing an example of a network system to which the present invention is applied.

As illustrated in FIG. 2, a management apparatus 10 manages a lower-layer network 20 including multiple servers and an upper-layer network 30 including multiple VNFs. To simplify the diagram, it is assumed that the lower-layer network 20 includes servers A, B, C, and D and the upper-layer network 30 includes virtual network functions VNF-1 to VNF-5.

At least one of the servers in the lower-layer network 20 includes a programmable logic circuit. As will be discussed later, a programmable logic circuit is a hardware circuit capable of performing programmable, routine processing at high speeds and is operable as an accelerator of a connected CPU. Also, a programmable logic circuit is advantageous in which it is able to implement a logic function desired by the user in a short period of time, as well as is rewritable. Hereafter, an FPGA will be described as an example of a programmable logic circuit. Also, a server in which a CPU and an FPGA are coupled to each other will be referred to as an FPGA-support server, and a server without an FPGA as an FPGA-non-support server.

Each of the VNFs in the upper-layer network 30 is set on a physical server in the lower-layer network 20. For example, in the system illustrated in FIG. 2, VNF-1 and VNF-2 are set on the server A, and VNF-3, VNF-4, and VNF-5 are set on the servers B, C, and D, respectively. The management apparatus 10 not only manages the VNFs on the FPGA-support servers and FPGA-non-support servers but also controls migration of a certain VNF to another server. An example of server configuration and VNF deployment is shown in FIG. 3.

<FPGA-Support Server>

Figure 3:
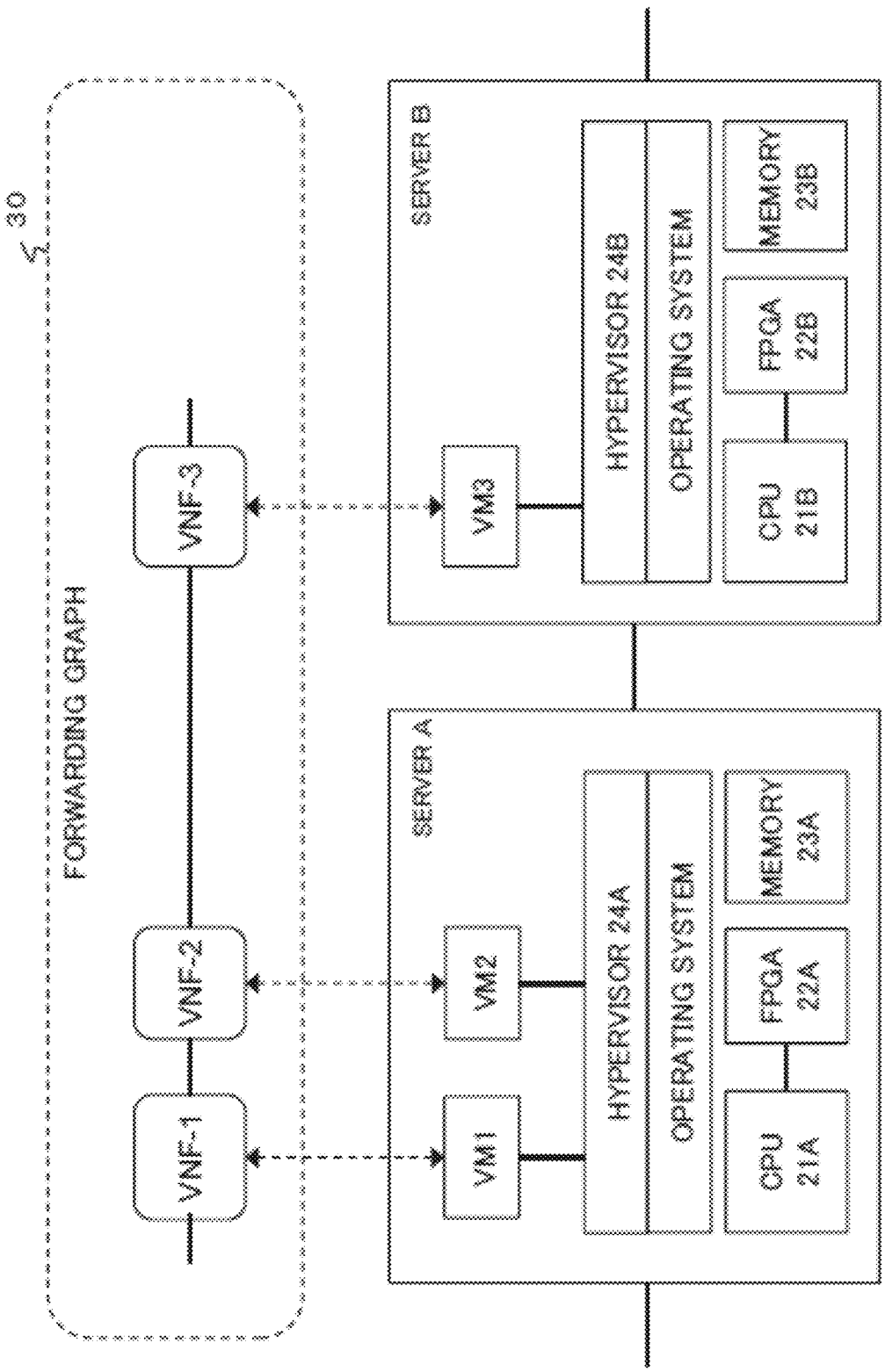
FIG. 3 is a schematic network diagram showing an example of the correspondences between physical servers and virtual network functions in the network system to which the present invention is applied.

As shown in FIG. 3, the FPGA-support server A in the lower-layer network 20 includes a CPU 21A, an FPGA 22A, and a memory 23A, and a hypervisor 24A runs on an operating system and is able to generate multiple virtual machines. Here, it is assumed that the hypervisor 24A generates two virtual machines VM1 and VM2 that execute the programs of VNF-1 and VNF-2, respectively. Similarly, the FPGA-support server B includes a CPU 21B, an FPGA 22B, and a memory 23B, and a hypervisor 24B runs on an operating system and is able to generate multiple virtual machines. Here, it is assumed that the hypervisor 24B generates a single virtual machine VM3 that executes the program of VNF-3.

Figure 4:
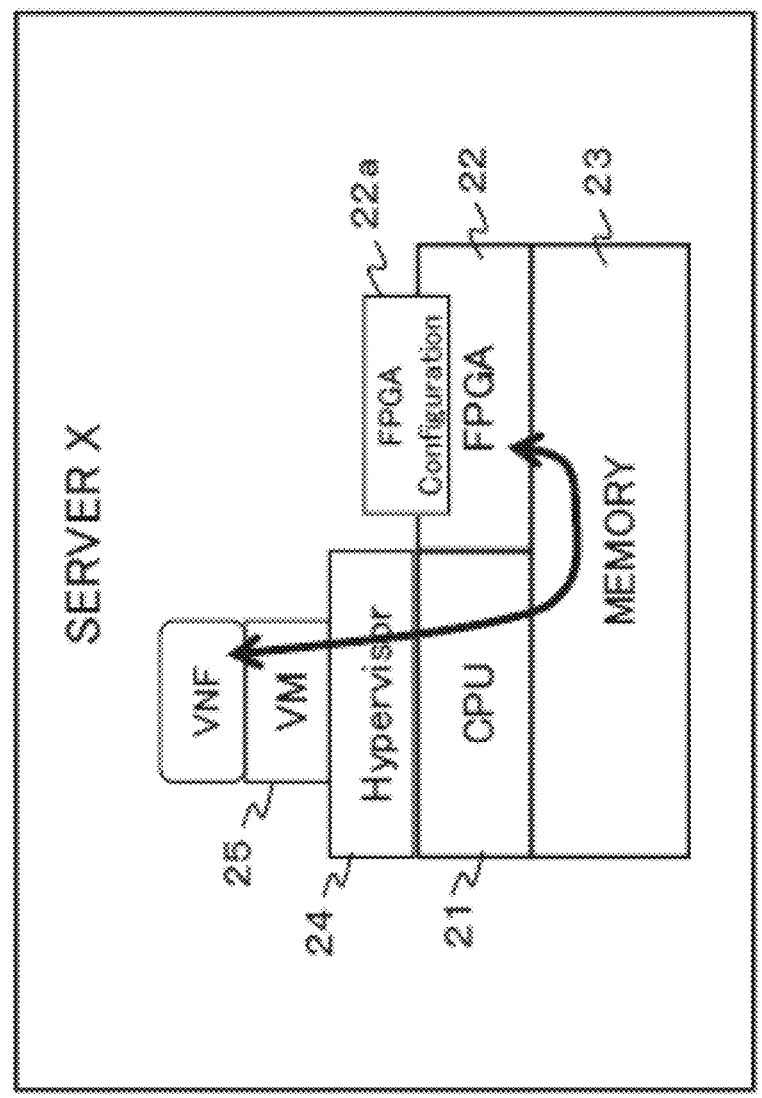
FIG. 4 is a block diagram schematically showing the configuration of a server shown in FIG. 3.

FIG. 4 shows a general configuration of an FPGA-support server in the network system. An FPGA-support server X includes an FPGA 22 coupled with a CPU 21. The CPU 21 executes a hypervisor 24, a virtual machine VM25, and a VNF on the operating system. The FPGA 22 is configured for a configuration 22a usable by the VNF according to configuration data. Thus, the VNF can exchange data with the FPGA through the memory 23 and transfer at least part of processing performed by the VNF to the FPGA. Details are as follows.

The virtual machine VM 25 receives packet data through the memory at a predetermined address, processes the received packet data according to a logic implemented by the configuration, and outputs packet data through the memory at a predetermined address. The FPGA 22 receives the packet data through the memory at the predetermined address, processes the data according to a logic configured according to the FPGA configuration, and outputs the processing result through the memory at a predetermined address. As seen above, when the VNF program writes data to the predetermined address, the FPGA 22 automatically reads and processes the data and writes the resulting data to an address to be outputted. This means that the VNF can leave predetermined processing to the FPGA 22, achieving high-speed processing as a whole. Note that the FPGA 22 may include multiple FPGA cores such that each FPGA core performs different VNF processing.

When moving the VNF running on the server X described above to another server X, the configuration of the FPGA 22 also needs to be moved. Accordingly, the management apparatus 10 needs to perform VNF migration while managing information about the FPGAs of the servers in the lower-layer network 20 and controlling the servers X.

As described above, the management apparatus 10 may centrally control the network system. There may be provided a management apparatus for each layer such that a management apparatus manages the upper-layer network 30 (VNF layer) and a management apparatus manages the lower-layer network 20 (VNFI layer). A management apparatus 10 and control method according to an embodiment of the present invention will be described in detail below with reference to the drawings.

1. Exemplary Embodiment

<Management Apparatus>

The management apparatus 10 according to an embodiment of the present invention performs correspondence management among servers, CPUs, FPGAs, and VNFs, path management, and VNF migration management in a lower-layer network 20 and an upper-layer network 30, allowing a desired, highly reliable forwarding graph to be configured so as not to cause a bottleneck in server processing and communication between servers.

Figure 5:
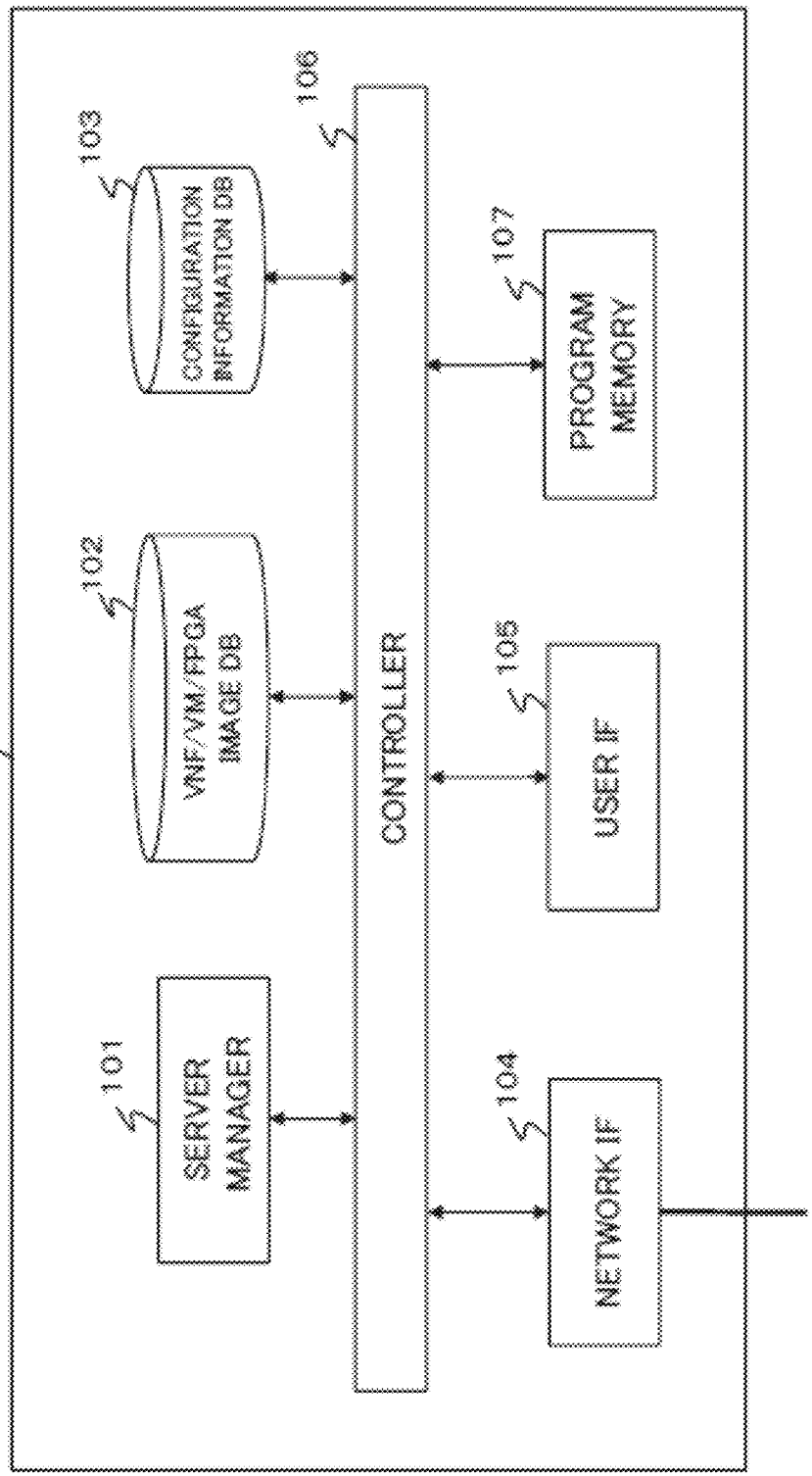
FIG. 5 is a block diagram showing a schematic configuration of a management apparatus according to one embodiment of the present invention.

In FIG. 5, the management apparatus 10 includes a server manager 101, a VNF/VM/FPGA image database 102, a configuration information database 103, a network interface 104, a user interface 105, a controller 106, and a program memory 107. The network interface 104 is connected to the servers in the lower-layer network 20 and upper-layer network 30. The operator can perform various settings and manual operations for management as will be discussed later through the user interface 105. By executing programs stored in the program memory 107, the controller 106 of the management apparatus 10 performs referencing, registering or updating the VNF/VM/FPGA image database 102 and the configuration information database 103, and thereby performs the correspondence management among the servers, CPUs, FPGAs, and VNFs, and VNF migration management, as will be discussed later.

Stored in the VNF/VM/FPGA image database 102 are image data of the VNFs and VMs to be run by the servers, FPGA configuration data, which is circuit information loaded into the FPGAs, and the like. Stored in the configuration information database 103 are static configuration information and dynamic configuration information shown in FIGS. 6 and 7, respectively.

<Configuration Information>

Referring to FIG. 6, the static configuration information includes fixed information about VNFs, servers, and FPGAs. In regard to VNF, information about VNF name, VNF function, whether the VNFs support an FPGA, VNF image file, and FPGA compatibility are stored, in which specifically three VNFs (firewall, inspection, routing) are defined. In regard to server, information about multiple FPGA-support servers are stored, in which specifically, two servers Host1 and Host2 are defined. In regard to FPGA, information about FPGAs corresponding respectively to the three VNFs (firewall, inspection, routing) are stored. Note that the master image file in the VNF configuration information and the configuration data in the FPGA configuration information are stored in the VNF/VM/FPGA image database 102.

Figure 7:
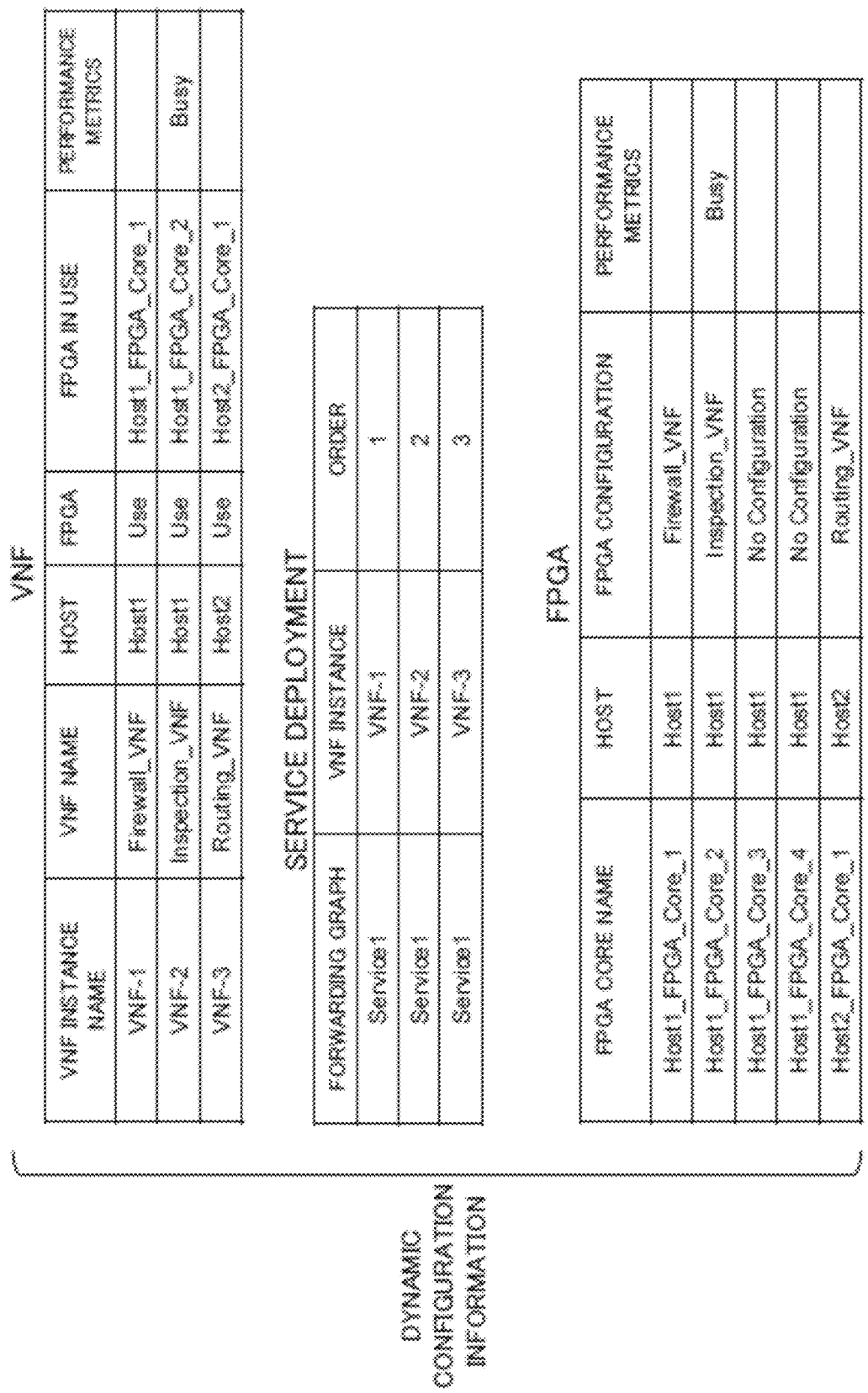
FIG. 7 is a schematic diagram showing an example of dynamic configuration information in the configuration information database in the management apparatus shown in FIG. 5.

Referring to FIG. 7, the dynamic configuration information includes information about VNF, service deployment, and FPGA, which are current setting information about them. In regard to VNF, VNF instance name, VNF name, host name, whether FPGA is in use, FPGA in use, and performance metrics are stored. Hereinafter, it is assumed that a VNF instance VNF-1 is a firewall function; a VNF instance VNF-2 is an inspection function; a VNF instance VNF-3 is a routing function; and the VNF-2 is in a "busy state" indicating reduced performance. In regard to service deployment, it is assumed that a forwarding graph Service1 consists of the three VNF instances VNF-1 to VNF-3. In regard to FPGA, an FPGA core 1 of the Host1 is loaded with firewall configuration data; an FPGA core 2 thereof is loaded with inspection configuration data and is currently decreased in performance; and an FPGA core 1 of the Host2 is loaded with routing configuration data.

The operator can monitor the state of the network through the user interface 105 of the management apparatus 10 and can know the performance of the VNF(s) running on each server from the dynamic configuration information in the configuration information database 103.

2. First Example

Now, a management method according to an example of the present invention will be described in detail, taking the configuration information shown in FIGS. 6 and 7 as an example.

In the dynamic configuration information as illustrated in FIG. 7, in the server (Host1), the FPGA core 1 is processing the VNF-1 (firewall) and the FPGA core 2 is processing the VNF-2 (inspection), wherein FPGA core 2 is decreased in performance due to the increased load thereon. At this time, the operator can move the VNF-2 to the Host2 under a smaller load through the user interface 105 as follows.

Figure 8:
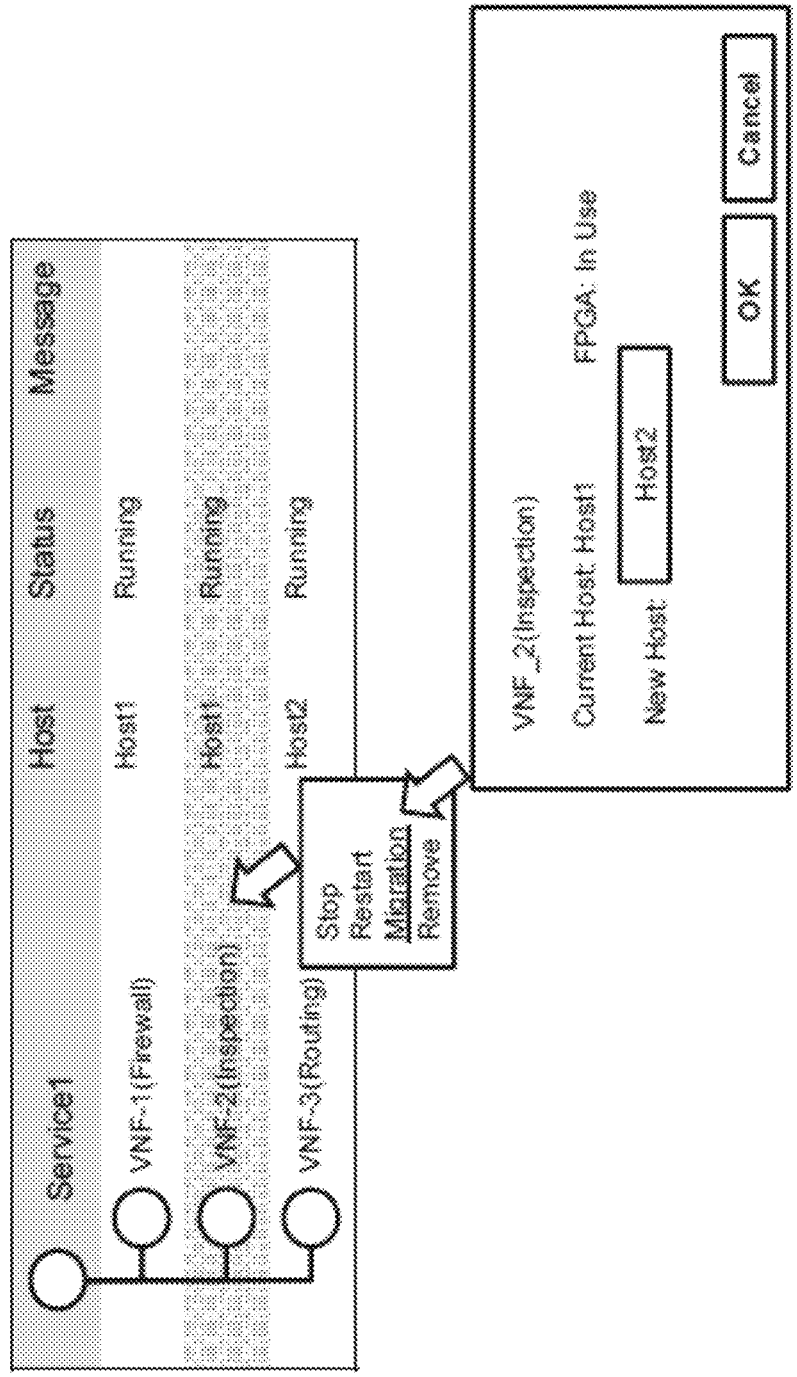
FIG. 8 is a schematic diagram showing an example of a user interface in a management method according to a first example of the present invention.

As illustrated in FIG. 8, the servers (Hosts) on which the VNF-1 to VNF-3 constituting Service1 are operating and the operating statuses of these VNFs are displayed on the monitor of the user interface 105 of the management apparatus 10. The operator selects the VNF-2 as the subject of migration from among the VNFs. Here, it is assumed that the controller 106 of the management apparatus 10 has retrieved the Host2, which supports a similar FPGA and is under a smaller load, as the migration destination of the VNF-2.

Figure 9:
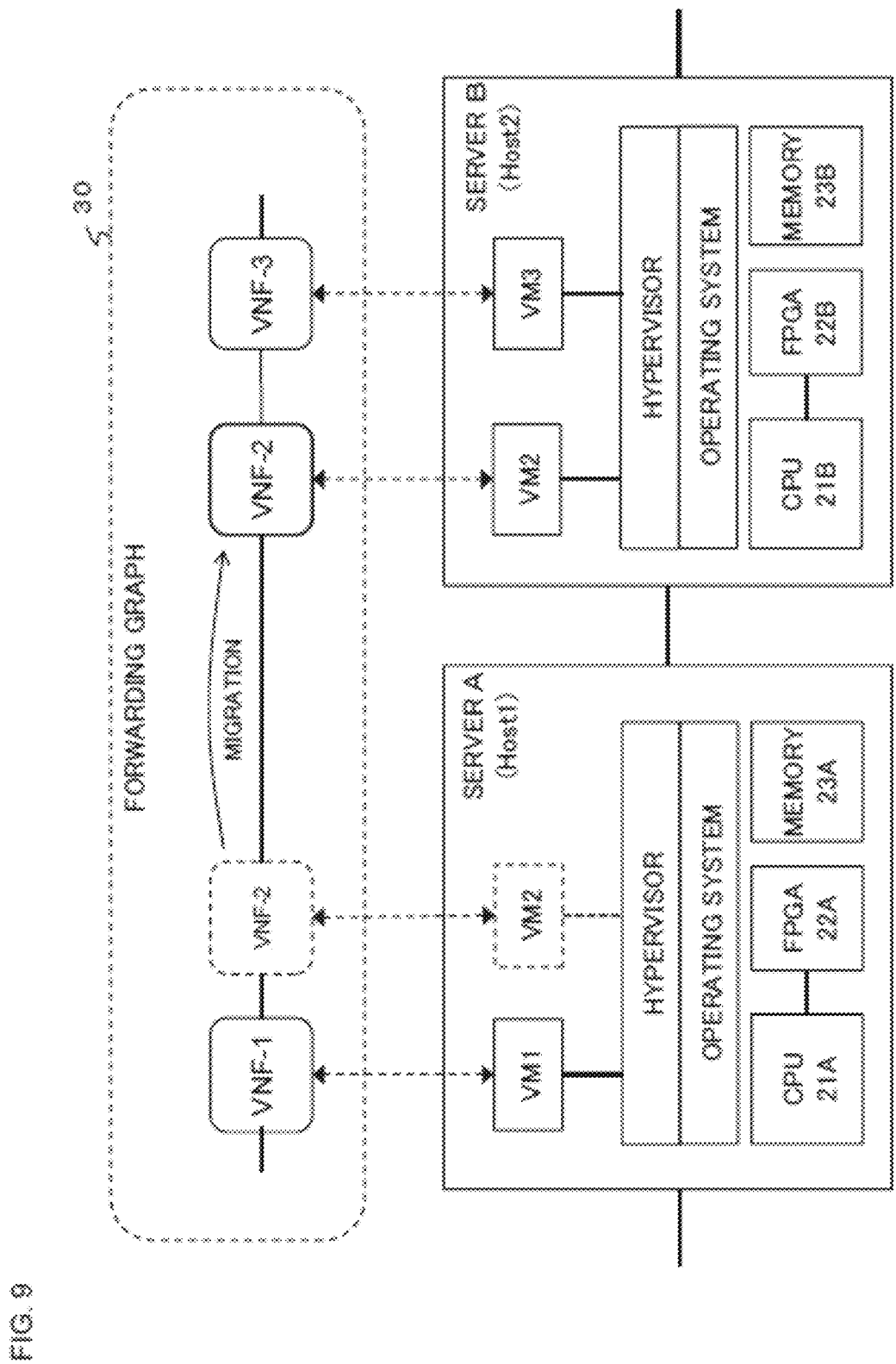
FIG. 9 is a schematic network diagram showing an example of migration in the management method according to the first example.

Referring to FIG. 9, Methods to perform migration of the VNF from the server A to the server B includes: cold migration (first example) in which VNF processing of the forwarding graph is temporarily stopped and then migration is performed; and hot migration (second example) using the live migration function of the hypervisor of the server.

2.1 Cold Migration

Figure 10:
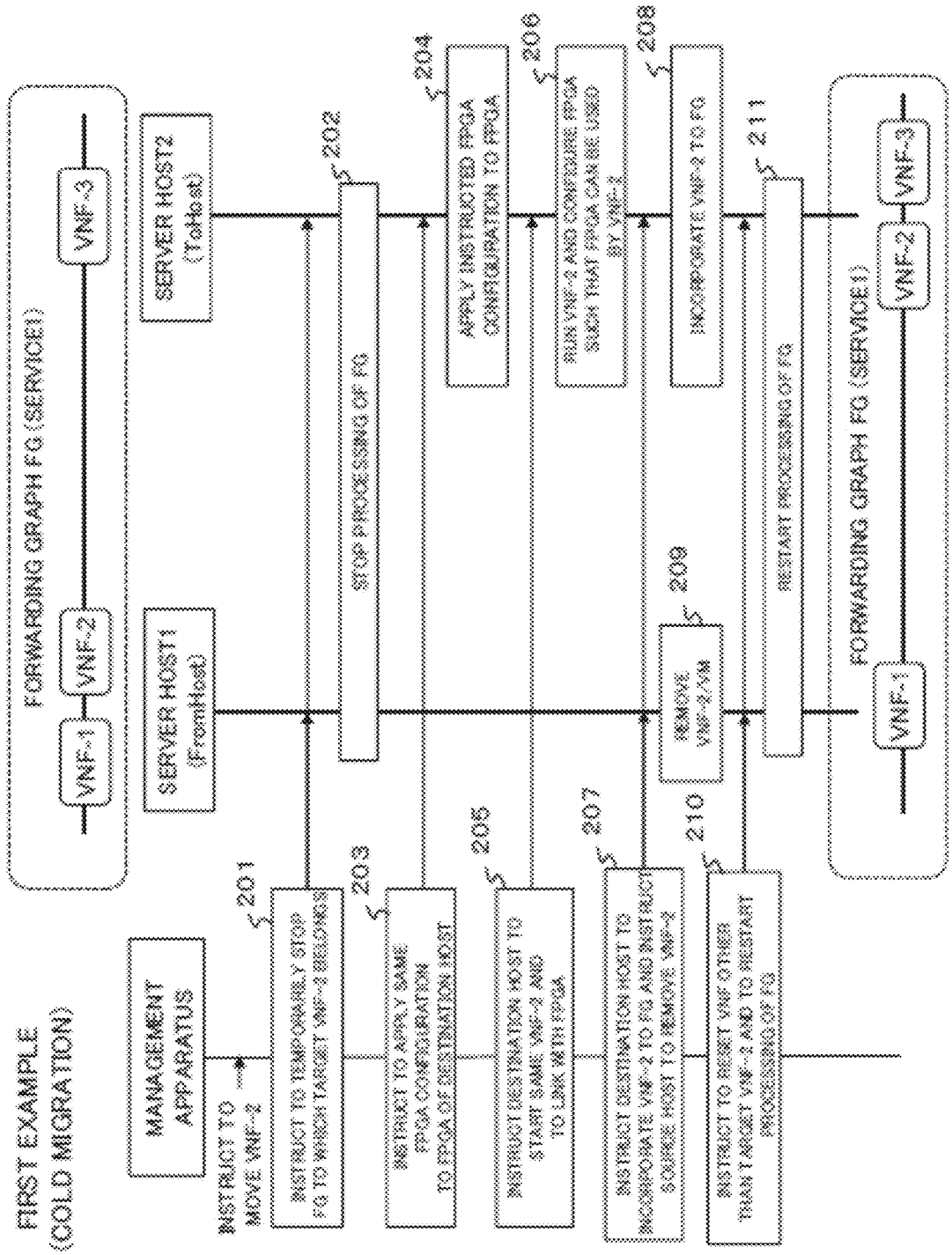
FIG. 10 is a sequence diagram showing cold migration in the management method according to the first example.

In FIG. 10, the operator instructs the controller 106 of the management apparatus 10 to perform migration of the VNF-2 from the server Host1 to the server Host2. In response to this instruction, the controller 106 transmits, to the respective servers, an instruction to temporarily stop processing of a forwarding graph FG (VNF-1 to VNF-3) to which the VNF-2 as the subject of migration belongs (operation 201). The servers temporarily stop processing of the corresponding VNFs in accordance with the temporary stop instruction (operation 202). Thus, the VNF-2 temporarily stops receiving packets.

Then, the controller 106 reads the same FPGA configuration data as that of the FPGA of the Host1 from the VNF/VM/FPGA image database 102 and transmits, to the Host2 which is the migration destination, an instruction to apply the read FPGA configuration data to the FPGA of the Host2 (operation 203). Thus, the Host2 applies the FPGA configuration data to the FPGA thereof (operation 204).

Subsequently, the controller 106 of the management apparatus 10 reads the same image data of the VNF-2 as that in the Host1 from the VNF/VM/FPGA image database 102 and transmits, to the Host2 which is the migration destination, an instruction to start the VNF-2 along with an instruction to link the VNF-2 with the FPGA (operation 205). Thus, the Host2 starts the VNF-2 and sets the previously configured FPGA so that the VNF-2 can use the FPGA (operation 206).

Subsequently, the controller 106 transmits, to the Host2, an instruction to incorporate the VNF-2 running thereon to the forwarding graph FG and transmits, to the Host1, an instruction to remove the VNF-2 therefrom (operation 207). Thus, the Host2 incorporates the VNF-2 to the forwarding graph FG, and the Host1 removes the VNF-2 therefrom (operations 208, 209).

The controller 106 then instructs the respective servers to reset the VNFs other than the VNF-2 and to restart processing of the forwarding graph (operation 210). Thus, processing of the forwarding graph FG consisting of the VNF-1 on the Host1 and the VNF-2 and VNF-3 on the Host2 is restarted (operation 211).

2.2 Hot Migration

Figure 11:
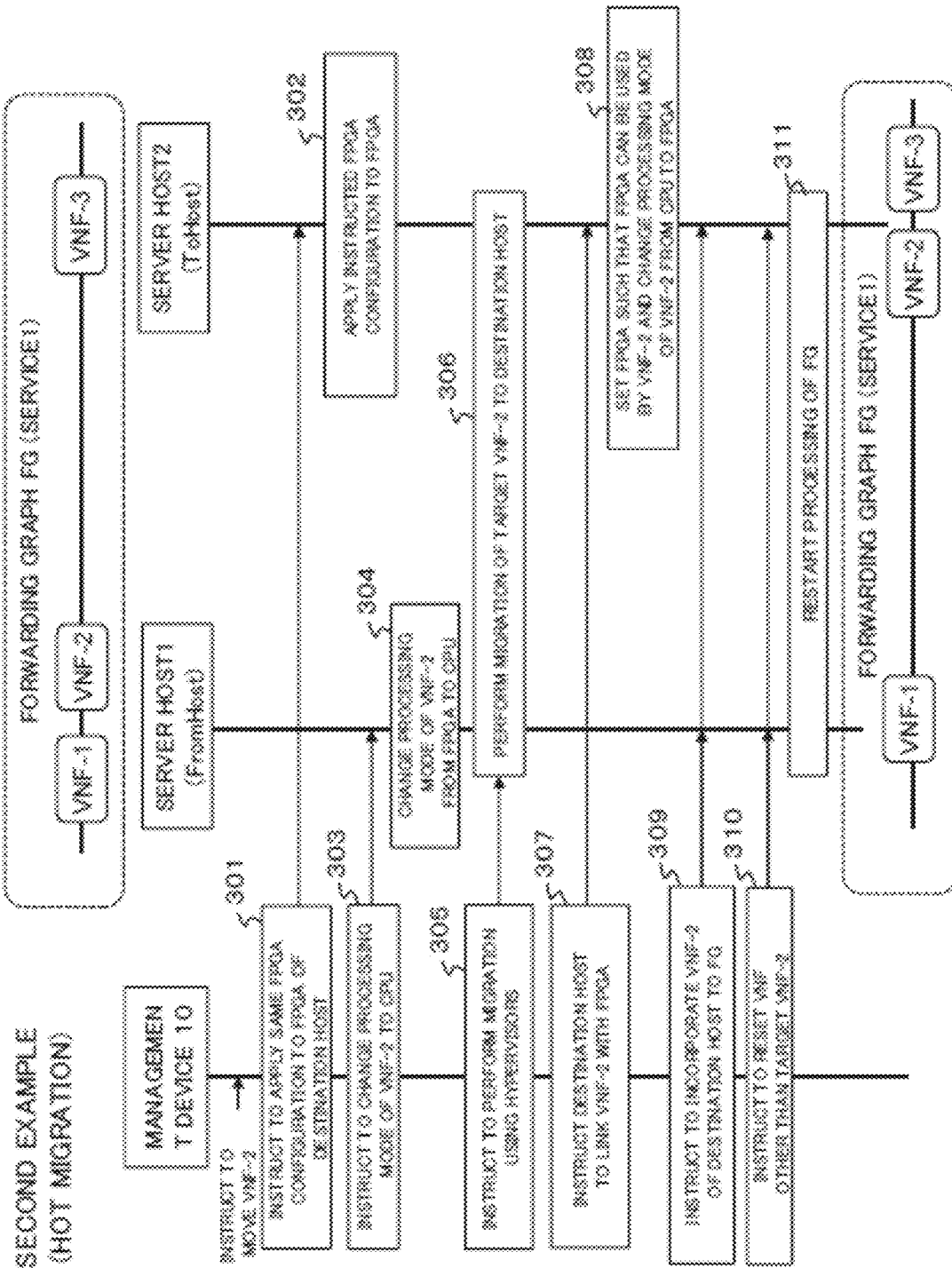
FIG. 11 is a sequence diagram showing hot migration in the management method according to the first example.

In FIG. 11, first, the operator instructs the controller 106 of the management apparatus 10 to perform migration of the VNF-2 from the server Host1 to the server Host2. The controller 106 reads the same FPGA configuration data as that of the FPGA of the Host1 from the VNF/VM/FPGA image database 102 and transmits, to the Host2 which is the migration destination, an instruction to apply the read FPGA configuration data to the FPGA thereof (operation 301). Thus, the Host2 applies the FPGA configuration data to the FPGA thereof (operation 302).

Subsequently, the controller 106 of the management apparatus 10 instructs the Host1 to change the processing mode of the VNF-2 from the FPGA to the CPU (operation 303). When the Host1 has changed the processing mode of the VNF-2 to the CPU in accordance with this instruction (operation 304), the controller 106 instructs the Host1 and Host2 to perform migration of the VNF-2 using the hypervisors (live migration) (operation 305). Thus, the Host1 and Host2 perform live migration of the VNF-2 from the Host1 to the Host2 (operation 306).

When the migration is complete, the controller 106 of the management apparatus 10 transmits, to the Host2, an instruction to link the VNF-2 with the FPGA thereof (operation 307). In accordance with this link instruction, the Host2 sets the previously configured FPGA so that the VNF-2 can use the FPGA and changes the processing mode of the VNF-2 from the CPU to the FPGA (operation 308).

If necessary, the controller 106 instructs the servers to incorporate the VNF-2 running on the Host2 to the forwarding graph FG, to reset the VNFs other than the VNF-2, and to restart processing of the forwarding graph (operations 309 to 311). Thus, processing of the forwarding graph FG consisting of the VNF-1 on the Host1 and the VNF-2 and VNF-3 on the Host2 is continued.

Figure 12:
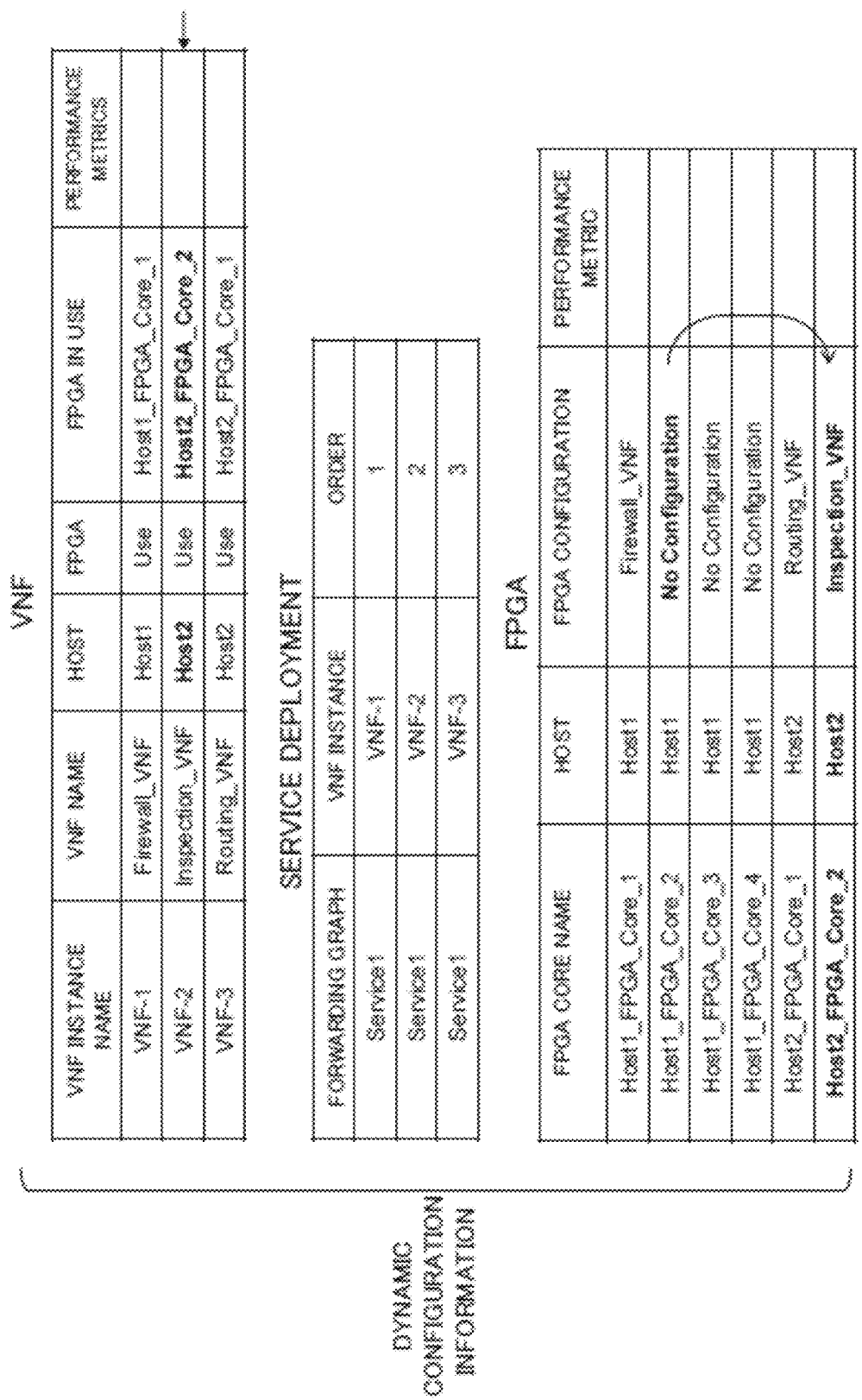
FIG. 12 is a schematic diagram showing an example of the dynamic configuration information in the configuration information database after migration according to the first example.

FIG. 12 shows changes in the dynamic configuration information due to the migration of the VNF-2 which is the target of migration from the Host1 to the Host2. By the FPGA core 2 of the Host2 operating the VNF-2, the performance metrics of the VNF-2 becomes no longer "Busy," and the FPGA core 2 of the Host1 is in a non-configuration state. Instead, the FPGA core 2 of the Host2 has been an entity which runs the VNF-2.

3. Second Example

Next, a management method according to a second example of the present invention will be described in detail, taking as an example dynamic configuration information shown in FIG. 12, that is, a forwarding graph FG consisting of the VNF-1 on the Host1 and the VNF-2 and VNF-3 on the Host2.

Figure 13:
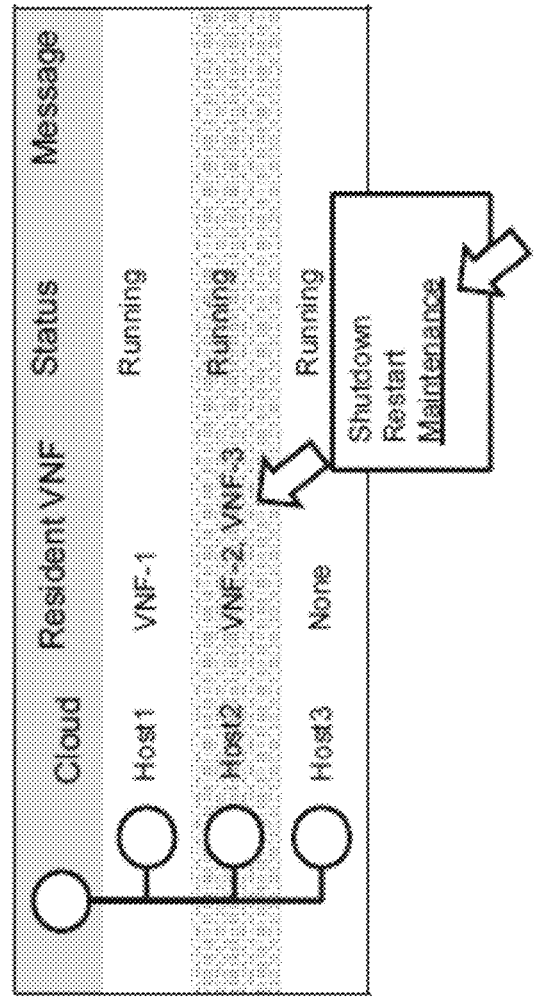
FIG. 13 is a schematic diagram showing an example of a user interface in a management method according to a second example of the present invention.

As illustrated in FIG. 13, it is assumed that the operator instructs the controller 106 of the management apparatus 10 to maintain the server (Host2) in a state in which the FPGA core 1 of the server (Host1) processes the VNF-1 (firewall), the FPGA core 1 of the server (Host2) processes the VNF-3, and the FPGA core 2 of the server (Host2) processes the VNF-2 (inspection).

Figure 14:
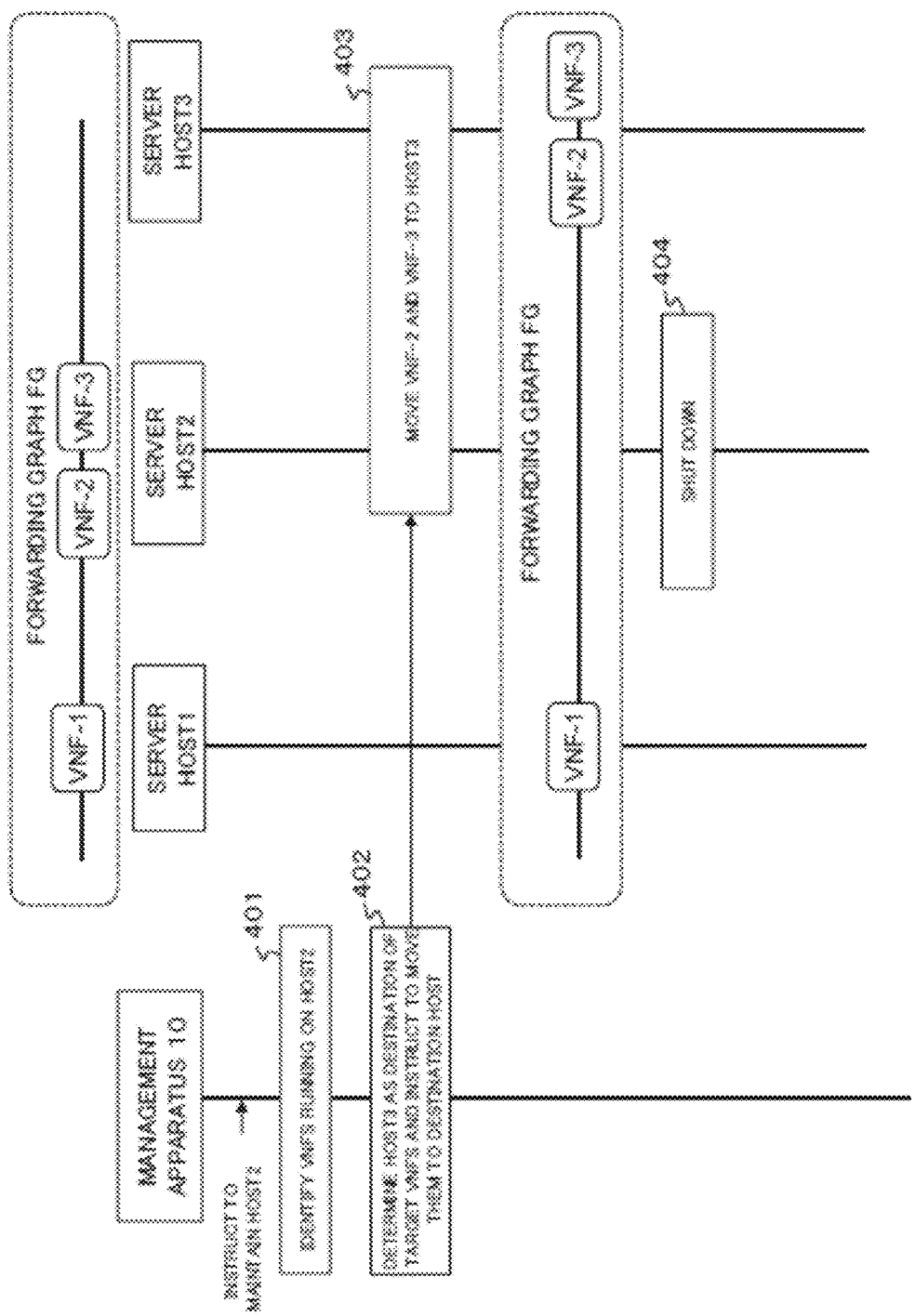
FIG. 14 is a sequence diagram showing operations at the time of maintenance in the management method according to the second example.

In FIG. 14, the operator instructs the controller 106 of the management apparatus 10 to maintain the server Host2 on which the VNF-2 and VNF-3 are running. In response to this instruction, the controller 106 identifies VNFs (herein, the VNF-2 and VNF-3) running on the Host2 with reference to the dynamic configuration information (operation 401).

The controller 106 determines a Host server which is the destination of the target VNFs to be moved, on the basis of server information (load situation or the like) from the server manager 101, and instructs to move the target VNFs to the destination Host (operation 402). The destination Host may be any server as long as the server can afford to run the identified VNFs. Here, it is assumed that a Host3 on which no VNF is running is determined as the destination. Note that all the identified multiple VNFs need not be moved to the single Host and may be separately moved to multiple Hosts in accordance with the load state of the destination.

The Host2 as the source server and the Host3 as the destination server move the target VNF from the Host2 to the Host3 in accordance with the movement instruction from the management apparatus 10 (operation 403). This VNF movement can be performed in accordance with the above-mentioned migration and therefore will not be described in detail.

When the VNF-2 and VNF-3 are moved to the Host3 and the forwarding graph FG is restarted, the server Host2 is shut down and maintained (operation 404).

4. Other Embodiments

In the above embodiment, the network system is centrally managed by the management apparatus 10. In the present invention, however, the network system need not be centrally managed, and the layers of a multilayer system may be managed by different managers in coordination with each other. An example of such a distributed management system is shown in FIG. 15.

Figure 15:
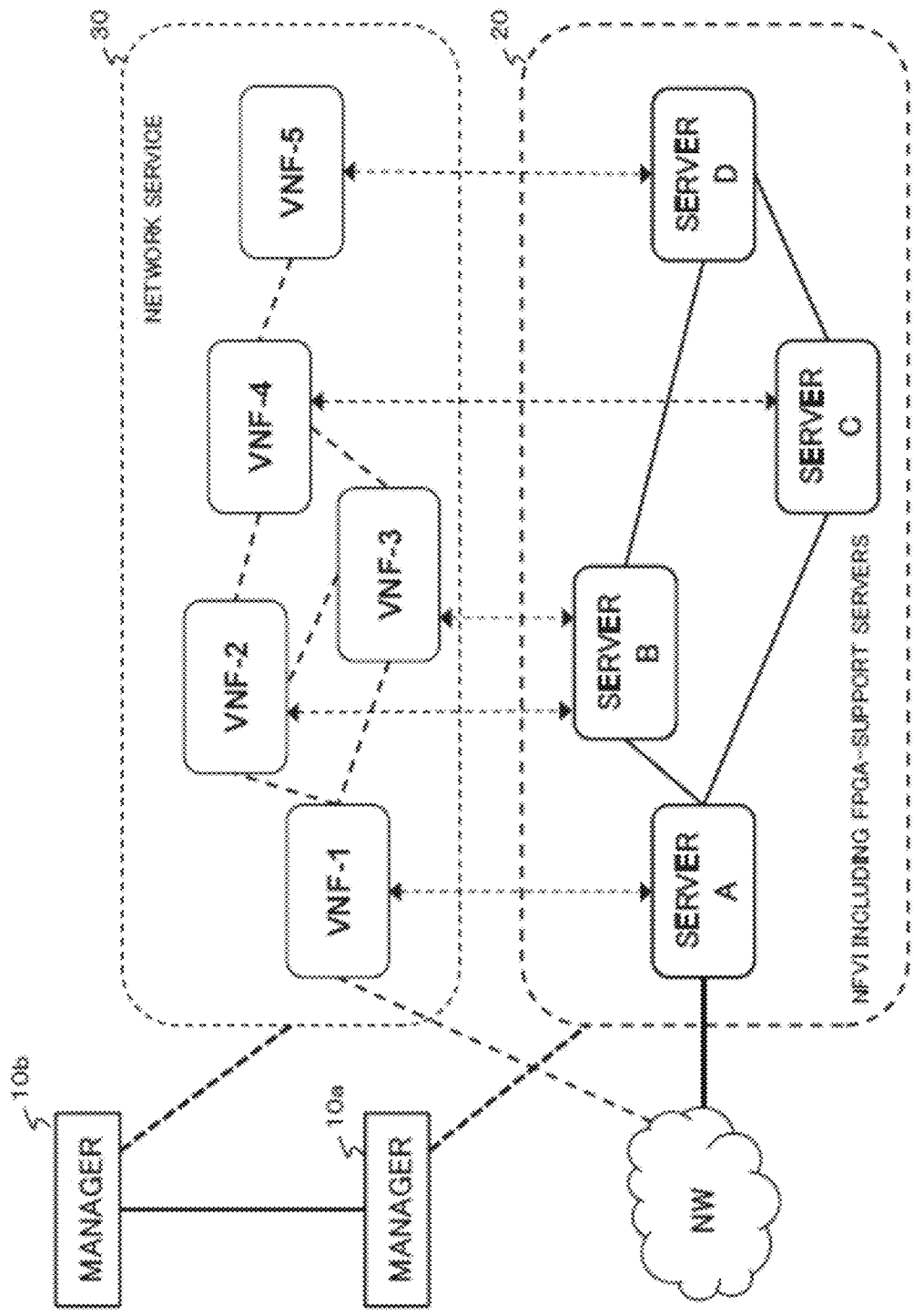
FIG. 15 is a schematic network diagram showing an example of a network system according to another embodiment of the present invention.

As illustrated in FIG. 15, a network system includes a manager 10a that manages a lower-layer network 20 (VNFI layer) and a manager 10b that manages an upper-layer network 30 (VNF layer). The managers 10a and 10b manage the lower-layer network 20 and upper-layer network 30 in coordination with each other. Its management method is similar to that described in the above embodiment and examples and therefore will not be described.

In the case of the managers 10a and 10b that manage the respective layers, different devices connected such that they can communicate with each other may perform the management operations of the above embodiment in coordination with each other, or the managers 10a and 10b may perform the management operations under the management of a higher-order device. The managers 10a and 10b that control the respective layers may be provided in a single management apparatus, or a higher-order manager that manage the managers 10a and 10b may be provided in a single management apparatus in a functionally separated manner.

While the invention has been particularly shown and described with reference to exemplary embodiments thereof, the invention is not limited to these embodiments. It will be understood by those of ordinary skill in the art that various changes in form and details may be made therein without departing from the sprit and scope of the present invention as defined by the claims.

INDUSTRIAL APPLICABILITY

The present invention can be used in systems where virtual network functions (VNFs) are deployed on a network.

DESCRIPTION OF REFERENCE SIGNS

10: management apparatus
20: lower-layer network
21, 21A, 21B: CPU
22, 22A, 22B: FPGA
22a: FPGA configuration
23, 23A, 23B: memory
24, 24A, 24B: hypervisor
25: VM
30: upper-layer network
101: server manager
102: VNF/VM/FPGA image database
103: configuration information database
104: network interface
105: user interface
106: controller
107: program memory

The invention claimed is:

1. A management apparatus of a network including servers on which virtual network functions operate, comprising:
    a database that stores information indicating a correspondence between a plurality of virtual network functions operating on a plurality of servers and a plurality of programmable logic circuits capable of operating at least part of a virtual network function, information related to performance of the plurality of programmable logic circuits, and information related to performance of the plurality of virtual network functions; and
    a processor configured to execute instructions to:
        receive an instruction to maintenance the first server;
        identify a virtual network function operated by a first programmable logic circuit included in the first server based on the information indicating the correspondence, according to the instruction to maintenance the first server;
        determine a second server to migrate the identified virtual network function from the first server based on load status of the plurality of servers;
        control the first server and the second server to perform migration of the identified virtual network function to the second server, based on the information indicating the correspondence, the information related to performance of the plurality of programmable logic circuits, and the information related to performance of the plurality of virtual network functions; and control the second server to operate at least part of the identified virtual network function on a second programmable logic circuit included in the second server, wherein the processor is further configured to execute instructions to:

stop processing of a forwarding graph to which the virtual network function belongs before performing the migration; and after the migration has been complete, restart the processing of the forwarding graph.

2. The management apparatus of claim 1, wherein the processor is further configured to execute instructions to switch a processing entity of the virtual network function to a central processing unit (CPU) in the first server before moving the virtual network function from the first server to the second server through a live migration function.

3. The management apparatus of claim 1, wherein the first programmable logic circuit operates a plurality of virtual network functions, wherein the processor is further configured to execute instructions to:

identify the plurality of virtual network functions operated by the first programmable logic circuit based on the information indicating the correspondence, according to the instruction to maintenance the first server;

determine destination servers including the second server to migrate the identified virtual network functions based on load statuses of the plurality of servers;

control the first server and the destination servers to perform migration of the identified virtual network functions to the destination servers, based on the information indicating the correspondence, the information related to performance of the plurality of programmable logic circuits, and the information related to performance of the plurality of virtual network functions; and control the destination servers to operate at least part of the identified virtual network functions on programmable logic circuits included in the destination servers.

4. A management method of a network including servers on which virtual network functions operate, comprising:

storing, in a database, information indicating a correspondence between a plurality of virtual network functions operating on a plurality of servers and a plurality of programmable logic circuits capable of operating at least part of a virtual network function, information related to performance of the plurality of programmable logic circuits, and information related to performance of the plurality of virtual network functions; and receiving, by a processor, an instruction to maintenance the first server;

identifying, by the processor, a virtual network function operated by a first programmable logic circuit included in the first server based on the information indicating the correspondence, according to the instruction to maintenance the first server;

determining, by the processor, a second server to migrate the identified virtual network function from the first server based on load status of the plurality of servers;

controlling, by the processor, the first server and the second server to perform migration of the identified virtual network function to the second server, based on the information indicating the correspondence, the information related to performance of the plurality of programmable logic circuits, and the information related to performance of the plurality of virtual network functions; and controlling, by the processor, the second server to operate at least part of the identified virtual network function on a second programmable logic circuit included in the second server, wherein the management method further comprises:

stopping, by the processor, processing of a forwarding graph to which the virtual network function belongs before performing the migration; and after the migration has been complete, restarting, by the processor, the processing of the forwarding graph.

5. The management method of claim 4, further comprising switching a processing entity of the virtual network function to a central processing unit (CPU) in the first server before moving the virtual network function from the first server to the second server through a live migration function.

6. The management method of claim 4, wherein the first programmable logic circuit operates a plurality of virtual network functions, and wherein the management method further comprises:

identifying the plurality of virtual network functions operated by the first programmable logic circuit based on the information indicating the correspondence, according to the instruction to maintenance the first server;

determining destination servers including the second server to migrate the identified virtual network functions based on load statuses of the plurality of servers;

controlling the first server and the destination servers to perform migration of the identified virtual network functions to the destination servers, based on the information indicating the correspondence, the information related to performance of the plurality of programmable logic circuits, and the information related to performance of the plurality of virtual network functions; and controlling the destination servers to operate at least part of the identified virtual network functions on programmable logic circuits included in the destination servers.

7. A network system comprising:

a network including servers on which virtual network functions operate; and a management apparatus that manages the network, wherein the management apparatus comprises:

a database that stores information indicating a correspondence between a plurality of virtual network functions operating on a plurality of servers and a plurality of programmable logic circuits capable of operating at least part of a virtual network function, information related to performance of the plurality of programmable logic circuits, and information related to performance of the plurality of virtual network functions; and a processor configured to execute instructions to:

receive an instruction to maintenance the first server;

identify a virtual network function operated by a first programmable logic circuit included in the first server based on the information indicating the correspondence, according to the instruction to maintenance the first server;

determine a second server to migrate the identified virtual network function from the first server based on load status of the plurality of servers;

control the first server and the second server to perform migration of the identified virtual network function to the second server, based on the information indicating the correspondence, the information related to performance of the plurality of programmable logic circuits, and the information related to performance of the plurality of virtual network functions; and control the second server to operate at least part of the identified virtual network function on a second programmable logic circuit included in the second server, wherein the processor is further configured to execute instructions to:

stop processing of a forwarding graph to which the virtual network function belongs before performing the migration; and after the migration has been complete, restart the processing of the forwarding graph.

8. The network system of claim 7, wherein the processor is further configured to execute instructions to switch a processing entity of the virtual network function to a central processing unit (CPU) in the first server before moving the virtual network function from the first server to the second server through a live migration function.

9. The network system of claim 7, wherein the first programmable logic circuit operates a plurality of virtual network functions, wherein the processor is further configured to execute instructions to:

identify the plurality of virtual network functions operated by the first programmable logic circuit based on the information indicating the correspondence, according to the instruction to maintenance the first server;

determine destination servers including the second server to migrate the identified virtual network functions based on load statuses of the plurality of servers;

control the first server and the destination servers to perform migration of the identified virtual network functions to the destination servers, based on the information indicating the correspondence, the information related to performance of the plurality of programmable logic circuits, and the information related to performance of the plurality of virtual network functions; and control the destination servers to operate at least part of the identified virtual network functions on programmable logic circuits included in the destination servers.

\* \* \* \* \*